(12) United States Patent
Maeda et al.

(10) Patent No.: US 10,007,075 B2
(45) Date of Patent: Jun. 26, 2018

(54) OPTICAL MODULE AND TRANSMISSION DEVICE

(71) Applicant: Oclaro Japan, Inc., Sagamihara, Kanagawa (JP)

(72) Inventors: Fumihide Maeda, Kanagawa (JP); Hiroki Irie, Kanagawa (JP); Hiroyoshi Ishii, Kanagawa (JP); Toshikazu Ohtake, Kanagawa (JP)

(73) Assignee: Oclaro Japan, Inc., Sagamihara (JP)

( * ) Notice: Subject to any disclaimer, the term of this patent is extended or adjusted under 35 U.S.C. 154(b) by 0 days. days.

(21) Appl. No.: 15/696,653

(22) Filed: Sep. 6, 2017

(65) Prior Publication Data

US 2018/0074274 A1 Mar. 15, 2018

(30) Foreign Application Priority Data

Sep. 13, 2016 (JP) .................................. 2016-178655

(51) Int. Cl.
  *G02B 6/00* (2006.01)
  *G02B 6/42* (2006.01)
(52) U.S. Cl.
  CPC .......... *G02B 6/4274* (2013.01); *G02B 6/428* (2013.01); *G02B 6/4256* (2013.01); *G02B 6/4277* (2013.01); *G02B 6/4284* (2013.01)
(58) Field of Classification Search
  CPC .. G02B 6/4274; G02B 6/4256; G02B 6/4277; G02B 6/428; G02B 6/4284

USPC ........................................................ 385/135
See application file for complete search history.

(56) References Cited

U.S. PATENT DOCUMENTS

2017/0268974 A1* 9/2017 Brown ................... G01N 9/002

FOREIGN PATENT DOCUMENTS

JP 2013-257461 A 12/2013

* cited by examiner

*Primary Examiner* — Jerry Blevins
(74) *Attorney, Agent, or Firm* — Mattingly & Malur, PC

(57) ABSTRACT

The optical module includes a housing having a first opening for inputting or outputting a first electric signal, a second opening for inputting or outputting a second electric signal, and an optical signal port, one or more substrates disposed in the housing, to/from which the first electric signal is input/output and to/from which the second electric signal is input/output, an optical subassembly disposed in the housing and optically connected to the optical signal port, and a control circuit disposed in the housing and mounted on the substrate for controlling the optical subassembly, wherein the first electric signal is an electric signal input to or output from the optical subassembly, the second electric signal is an electric signal input to or output from the control circuit, and the second opening is provided on one side different from other side of the housing on which the first opening is provided.

9 Claims, 6 Drawing Sheets

OPTICAL MODULE AND TRANSMISSION DEVICE

CROSS-REFERENCE TO RELATED APPLICATION

The present application claims priority from Japanese application JP 2016-178655, filed on Sep. 13, 2016, the content of which is hereby incorporated by reference into this application.

BACKGROUND OF THE INVENTION

1. Field of the Invention

The present invention relates to an optical module and a transmission device.

2. Description of the Related Art

An optical module is known which incorporates optical subassemblies such as a transmitter optical subassembly (TOSA) and a receiver optical subassembly (ROSA) to receive and transmit optical signals.

JP 2013-257461 A discloses an optical module including an optical transmitter having a first predetermined number of output terminals, and an optical receiver having a second predetermined number of input terminals.

The optical module comprises an electric port inputting/outputting electric signals to/from an optical subassembly. The electric port may be provided with wirings used for transmitting the electric signals to the optical subassembly as well as for maintenance such as writing programs.

In recent years, increase in the transmission capacity of the optical module and downsizing of the housing of the optical module have been advancing. As the transmission capacity of the optical module increases, it becomes necessary to increase the number of wirings for transmitting the electric signals to the optical subassembly. When the housing is downsized, it is necessary to provide the wiring in a relatively narrow area. Thus, it is difficult to provide further wirings used for maintenance of the optical module, and the maintenance of the optical module may become less convenient.

SUMMARY OF THE INVENTION

Therefore, it is an object of the invention to provide an optical module and a transmission device which realize compatibility between an increased transmission capacity as well as downsizing of the housing, and convenience in maintenance.

(1) In order to solve the above problem, an optical module of the invention includes a housing having a first opening for inputting or outputting a first electric signal, a second opening for inputting or outputting a second electric signal, and an optical signal port, one or more substrates disposed in the housing, to/from which the first electric signal is input/output through the first opening and to/from which the second electric signal is input/output through the second opening, an optical subassembly disposed in the housing and optically connected to the optical signal port, and a control circuit disposed in the housing and mounted on the substrate for controlling the optical subassembly, wherein the first electric signal input or output through the first opening is an electric signal input or output to the optical subassembly, the second electric signal input or output through the second opening is an electric signal input to or output from the control circuit, and the second opening is provided on one side of the housing different from other side of the housing on which the first opening is provided.

(2) The optical module as in (1), wherein the second opening is sealed by an electromagnetic radiation blocking means.

(3) The optical module as in (2), wherein the electromagnetic radiation blocking means is formed of conductive rubber.

(4) The optical module as in any one of (1) to (3), wherein the second opening is provided on the same side as one side on which the optical signal port is provided.

(5) The optical module as in (1), wherein the substrate has a terminal portion through which the second electric signal is input or output, the terminal portion being positioned at the outlet of the second opening.

(6) The optical module as in (5), wherein the housing has a guide wall connected to the upper side of the second opening and inclining downward from the second opening toward the terminal portion.

(7) The optical module as in (2) or (3), wherein the electromagnetic radiation blocking means has a stopper which meshes with the housing to fix the electromagnetic radiation blocking means in the second opening.

(8) The optical module as in (7), wherein the housing has a structure for releasing the meshing with the stopper.

(9) In order to solve the above problem, the transmission device of the invention includes an optical module and a host device, wherein the optical module includes a housing having a first opening for inputting or outputting a first electric signal, a second opening for inputting or outputting a second electric signal, and an optical signal port, one or more substrates disposed in the housing, to/from which the first electric signal is input/output through the first opening and to/from which the second electric signal is input/output through the second opening, an optical subassembly disposed in the housing and optically connected to the optical signal port, and a control circuit disposed in the housing and mounted on the substrate for controlling the optical subassembly, the first electric signal input or output through the first opening is an electric signal input to or output from the optical subassembly, the second electric signal input or output through the second opening is an electric signal input to or output from the control circuit, the second opening is provided on one side of the housing different from other side of the housing on which the first opening is provided, and the host device has a connector for inputting/outputting the first electric signal to/from the optical subassembly through the first opening, and a board for supporting the housing, and the second opening is sealed by an electromagnetic radiation blocking means.

(10) The transmission device as in (9), wherein the second opening is provided on the same side as one side of the housing on which the optical signal port is provided.

According to the invention, an optical module and a transmission device are provided, which realize compatibility between an increased transmission capacity of the optical module as well as downsizing of the housing, and convenience in maintenance of the optical module.

DETAILED DESCRIPTION OF THE INVENTION

Figure 1:
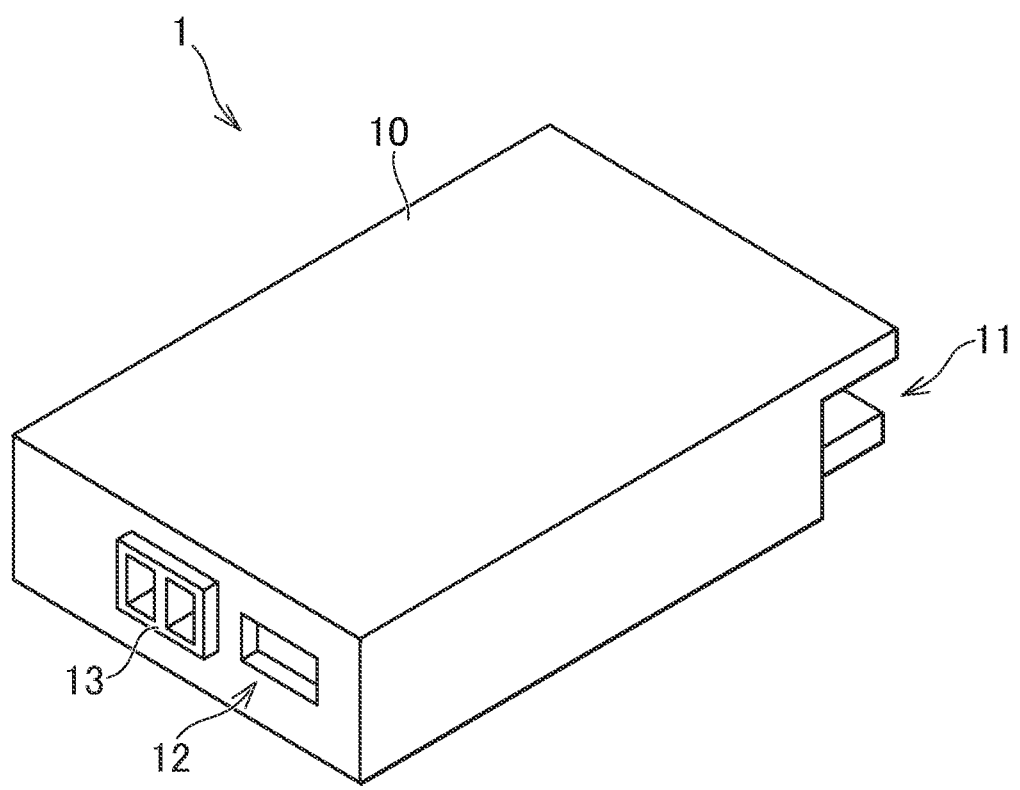
FIG. 1 is a first perspective view of an optical module of an embodiment of the invention.

Embodiments of the invention will be described below in detail with reference to the drawings. In all the drawings for illustrating the embodiments, components having the same function are given the same reference numerals, and the repetitive description thereof will be omitted. The drawings shown below merely illustrate examples of the embodiments, and the sizes of the drawings are not necessarily consistent with the scales described in the embodiments.

FIG. 1 is a first perspective view of an optical module 1 of an embodiment of the invention. The optical module 1 outputs an optical signal in response to an electric signal input from the outside by a transmitter optical subassembly (TOSA) incorporated in a housing 10, and outputs an electric signal in response to an optical signal input from the outside by a receiver optical subassembly (ROSA). The transmitter optical subassembly (TOSA) and the receiver optical subassembly (ROSA) are collectively referred to as an optical subassembly 50. Some embodiments of the invention will be described below by taking an optical module having both functions of the optical transmission and the optical reception as the optical module 1 of the embodiment, a so-called optical transceiver, as an example. However, the invention can also be applied to an optical transmitter having only a function of the optical transmission and an optical receiver having only a function of the optical reception.

The housing 10 has a first opening 11 for inputting or outputting a first electric signal, a second opening 12 for inputting or outputting a second electric signal, and an optical signal port 13. The first electric signal input or output through the first opening 11 is an electric signal input to or output from the optical subassembly 50. The second electric signal input or output through the second opening 12 is an electric signal input to or output from a control circuit 41. The second opening 12 is provided on one side of the housing 10 different from other side of the housing 10 on which the first opening 11 is provided. To be specific, the second opening is provided on one side of the housing 10 opposite to the side on which the first opening 11 is provided. The optical signal port 13 is a port transmitting an optical signal input to or output from the optical subassembly 50, and an optical fiber is connected to the optical signal port 13 from the outside.

Figure 2:
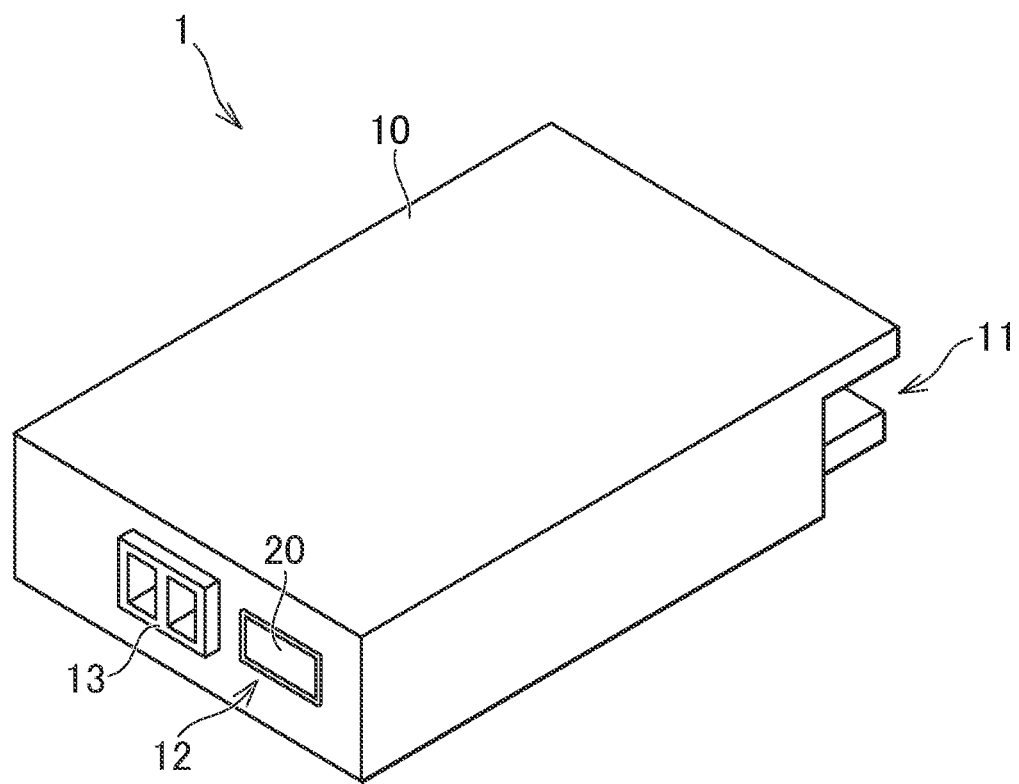
FIG. 2 is a second perspective view of the optical module of the embodiment of the invention.

FIG. 2 is a second perspective view of the optical module 1 of the embodiment of the invention. The optical module 1 with an electromagnetic radiation blocking means 20 inserted in the second opening 12 is shown in FIG. 2. The second opening 12 is blocked by the electromagnetic radiation blocking means 20. The electromagnetic radiation blocking means 20 prevents electromagnetic radiation generated in the housing 10 from leaking out of the housing 10. The electromagnetic radiation blocking means 20 will be described in detail below.

Figure 3:
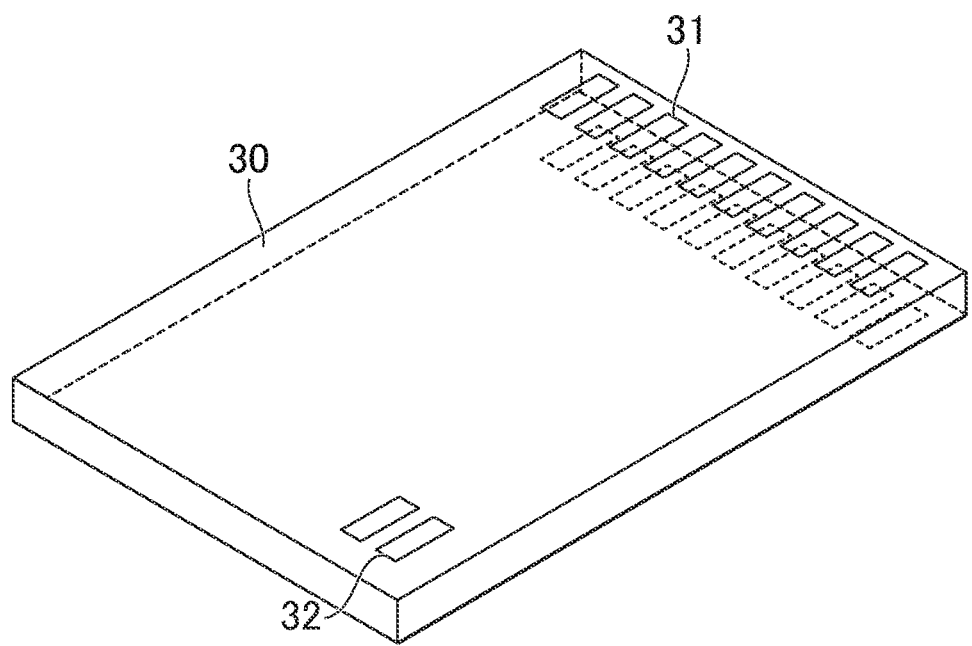
FIG. 3 is a perspective view of a substrate incorporated in the optical module of the embodiment of the invention.

FIG. 3 is a perspective view of a substrate 30 incorporated in the optical module 1 of the embodiment of the invention. The substrate 30 is disposed in the housing 10. The first electric signal is input to or output from the substrate 30 through the first opening 11. The second electric signal is input to or output from the substrate 30 through the second opening 12. The substrate 30 has a first electrode 31 and a second electrode 32. The first electrode 31 is exposed through the first opening 11. The second electrode 32 is positioned at the outlet of the second opening 12. This figure shows an example in which the first electrode 31 is provided on both surfaces of the substrate. However, the first electrode 31 may also be provided on one surface of the substrate 30. The second electrode 32 may be provided on both surfaces of the substrate 30, and may also be provided separately at a plurality of positions. Furthermore, the first electrode 31 may be electrically connected with the first opening 11 via an electric component such as a connector pin (a card edge connector, a plug connector), instead of being directly exposed through the first opening 11. In the optical module 1 of the embodiment, the first electrode 31 transmits the first electric signal input to or output from the optical subassembly 50, and the second electrode 32 transmits the second electric signal input to or output from the control circuit 41. Here, the first electric signal mainly indicates a high frequency signal used for optical transmission. However, not limited thereto, the first electric signal also includes an electric signal of DC such as a power supply. The second electric signal is mainly an electric signal of DC; however, it is not limited thereto. The optical module 1 of the embodiment incorporates the substrate 30 as one piece. However, the substrate 30 may also be provided as comprising a plurality of pieces. For example, it may be a two-substrate structure including one substrate connected to the first opening 11 and another substrate connected to the second opening 12. In the case of a two-substrate structure, the two substrates are electrically connected with each other via an electric connector and the like in the optical module during use.

Figure 4:
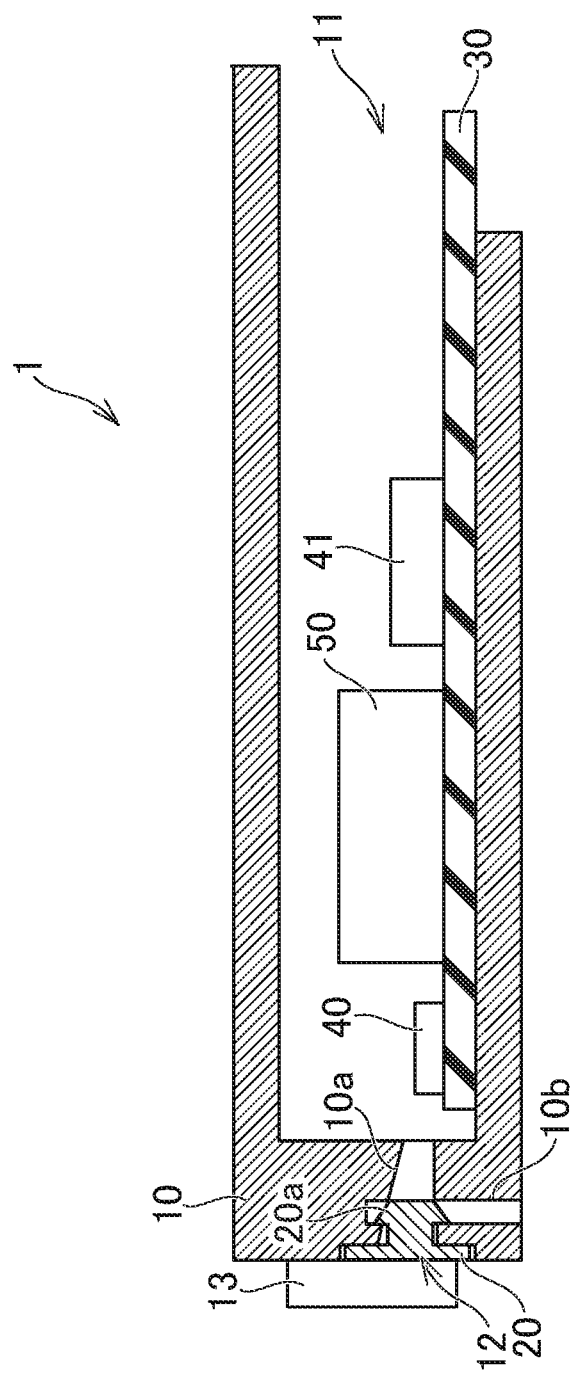
FIG. 4 is a sectional view of the optical module of the embodiment of the invention.

FIG. 4 is a sectional view of the optical module 1 of one embodiment of the invention. The optical module 1 includes: (1) the optical subassembly 50 disposed in the housing 10, mounted on the substrate 30 and optically connected to the optical signal port 13; and (2) the control circuit 41 disposed in the housing 10 and mounted on the substrate 30 for controlling the optical subassembly 50. The optical subassembly 50 is electrically connected to the first electrode 31 of the substrate 30, and the control circuit 41 is electrically connected to the second electrode 32 of the substrate 30. The optical subassembly 50 may also be disposed in front of the substrate 30 instead of being mounted on the substrate 30. The control circuit 41 is, for example, a microcomputer. In addition, an additional control circuit (such as a driving IC of TOSA) may be arranged between the control circuit 41 and the optical subassembly 50.

According to the optical module 1 of the embodiment, the wiring for transmitting the first electric signal input to or output from the optical subassembly 50 is concentrated in the first opening 11, and thus it is possible to increase the transmission capacity of the optical module 1 and reduce the size of the housing 10. It is also possible to provide auxiliary wirings at the outlet side of the second opening 12 for maintenance such as writing programs to the control circuit 41 and debugging the programs, and thus it is possible to ensure convenience in maintenance of the optical module 1. The second opening 12 may be used merely for monitoring the state (driving state and the like) of the optical module 1. That is, the second opening 12 may be used only for outputting the second electric signal, or it may be used only for inputting the program writing. Not restricted to the above example, it may be appropriately selected as needed as to which of the first electric signal and the second electric signal is to be distributed to the first opening 11 and the second opening 12. However, as will be described later, it is assumed that the second opening 12 is sealed by the electromagnetic radiation blocking means 20 in the use state of the optical module 1, and it is desirable that the electric signal needed in use is distributed to the first opening 11.

In the optical module 1 of the embodiment, the second opening 12 is sealed by the electromagnetic radiation blocking means 20 at least in a use state (a state in which the input and output of an optical signal and the input and output of an electric signal are conducted by the optical subassembly 50) of the optical module 1. The electromagnetic radiation blocking means 20 is formed of material which absorbs or shields electromagnetic radiation, and it prevents electromagnetic radiation generated from a high frequency circuit such as the control circuit 41 from leaking through the second opening 12. Therefore, according to the optical module 1 of the embodiment, it is possible to prevent crosstalk and ensure a good quality in communication even when a plurality of optical modules 1 are arranged side by side.

In the optical module 1 of the embodiment, the electromagnetic radiation blocking means 20 is formed of conductive rubber. Here, the conductive rubber is material which consists of rubber material mixed with conductive particles. The conductive rubber is an elastic body and a conductor, and it absorbs electromagnetic radiation. In the optical module 1 of the embodiment, as the electromagnetic radiation blocking means 20 is formed of conductive rubber, the electromagnetic radiation blocking means 20 can be installed such that it is squeezed into the second opening 12; since the electromagnetic radiation blocking means 20 is stuck to the inner wall of the housing 10, the fixing of the electromagnetic radiation blocking means 20 and the sealing of the second opening 12 can be performed reliably.

The electromagnetic radiation blocking means 20 may be formed of material other than the conductive rubber. The electromagnetic radiation blocking means 20 may be formed of, for example, metal, and may also be formed of magnetic material or resistive material. The electromagnetic radiation blocking means 20 can be formed of any material which absorbs or shields any electromagnetic radiation having the same wavelength band as one generated in the housing 10.

The second opening 12 is provided on the same side as one side of the housing 10 on which the optical signal port 13 is provided. The housing 10 of the optical module 1 of the embodiment has a roughly rectangular parallelepiped shape and has six sides. The second opening 12 is provided on the side on which the optical signal port 13 is provided, and the first opening 11 is provided on the side opposite to the side on which the optical signal port 13 is provided. Since it is necessary to insert an optical fiber from the outside into the optical signal port 13, the optical signal port 13 is provided on a side which is operable by a user even in a state that the first opening 11 of the optical module 1 is connected to an external device (a host device). By providing the second opening 12 on the side on which the optical signal port 13 is provided as in the optical module 1 of the embodiment, it is possible to operate the second opening 12 even after the optical module 1 is connected to an external device, and thus the maintenance work such as debugging of the control circuit 41 can be easily done. In the optical module 1 of the embodiment, the second opening 12 is provided on the side of the housing 10 on which the optical signal port 13 is provided. However, the position at which the second opening 12 is provided is not limited thereto. The second opening 12 can be provided on any side of the housing 10.

The substrate 30 has a terminal portion 40 through which the second electric signal is input or output. The terminal portion 40 is positioned at the outlet of the second opening 12. The housing 10 has a guide wall 10a connected to the upper side of the second opening 12 and inclining downward from the second opening 12 toward the terminal portion 40. The second opening 12 is formed such that the opening area narrows from the outer surface to the inner surface of the housing 10, and the height of the opening decreases towards the inside of the housing 10. When doing maintenance work such as writing programs to the control circuit 41 and debugging the programs, the electromagnetic radiation blocking means 20 inserted in the second opening 12 is detached, and an FPC (Flexible Printed Circuit) connected to an external computer is inserted from the second opening 12 into the terminal portion 40. As in the optical module 1 of the embodiment, since the guide wall 10a is provided in the housing 10 and is formed such that it inclines downward from the second opening 12 toward the terminal portion 40, the forepart of the FPC is guided to the terminal portion 40 when the FPC is inserted from the second opening 12, and insertion of the FPC into the terminal portion 40 becomes easy. In addition, since the outlet of the second opening 12 is formed such that the outlet is narrower than the inlet, passage of electromagnetic waves generated in the housing 10 is hindered and leakage of electromagnetic radiation is prevented. In the optical module 1 of the embodiment, the terminal portion 40 is provided in the housing 10. However, the terminal portion 40 may be provided on the surface of the housing 10, and may also be provided between the second opening 12 and the outlet (in the midcourse of the guide wall 10a provided in the housing 10).

The housing 10 of the optical module 1 of the embodiment has a removal hole 10b. The removal hole 10b is formed such that it penetrates the guide wall 10a connected to the upper side of the second opening 12 from the bottom surface to the upper surface of the housing 10. The electromagnetic radiation blocking means 20 has a stopper 20a which meshes with the housing 10 to fix the electromagnetic radiation blocking means 20 in the second opening 12. The removal hole 10b provided in the housing 10 is a structure for releasing the meshing with the stopper 20a. Since the stopper 20a meshes with the removal hole 10b, the electromagnetic radiation blocking means 20 is fixed such that it cannot be easily removed. This is because the electromagnetic radiation blocking means 20 should not be detached but should surely block the second opening 12 during regular use of the optical module 1. When initializing or adjusting the optical module 1, it is necessary to detach the electromagnetic radiation blocking means 20 exceptionally. In that case, a worker can insert a tool from the removal hole 10b, push up the stopper 20a of the electromagnetic radiation blocking means 20 to release the meshing between the stopper 20a and the removal hole 10b, and detach the electromagnetic radiation blocking means 20.

Figure 5:
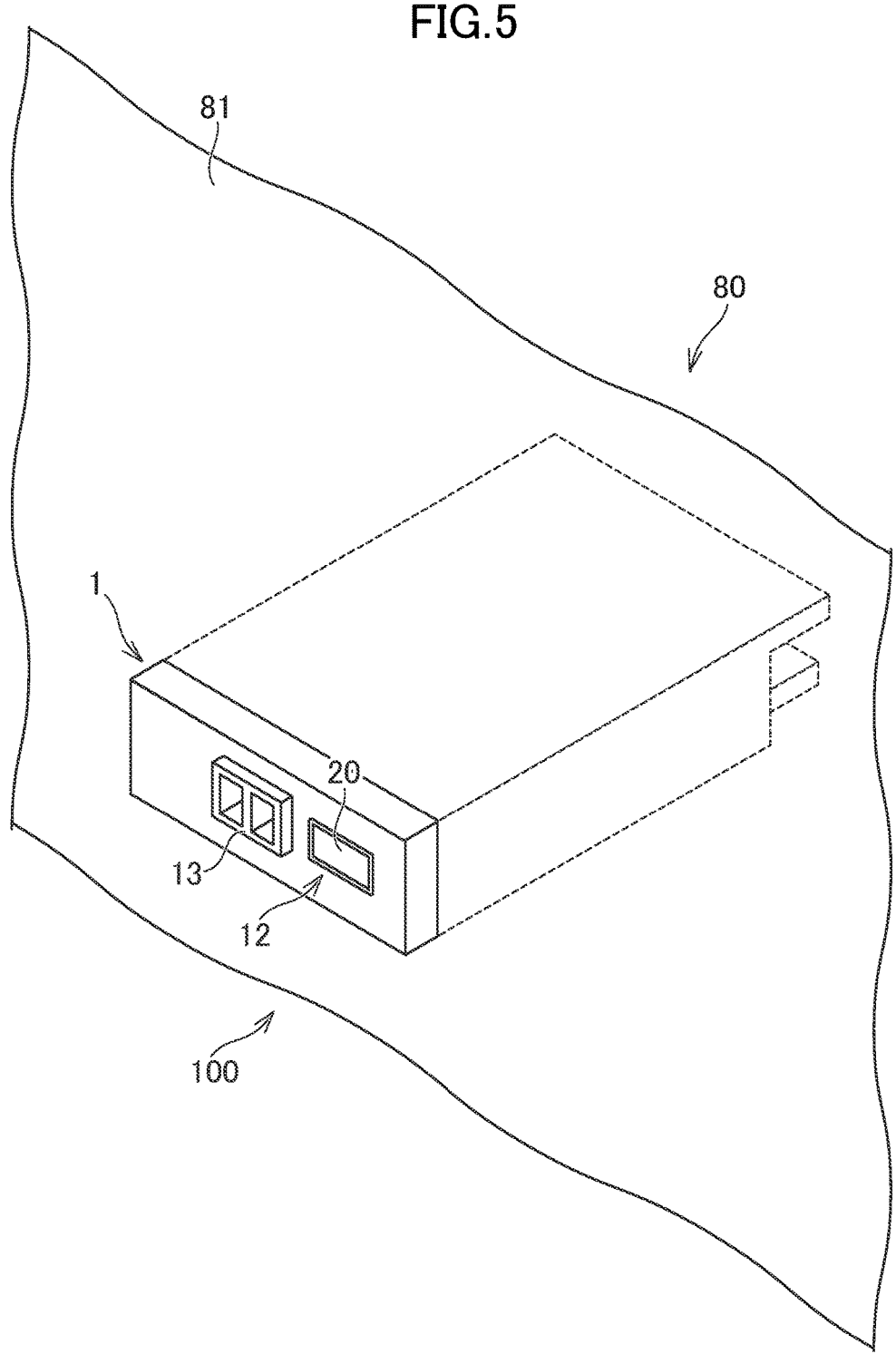
FIG. 5 is a perspective view of a transmission device of the embodiment of the invention.

FIG. 5 is a perspective view of a transmission device 100 of one embodiment of the invention. The transmission device 100 includes the optical module 1 and a host device 80. Here, the optical module 1 is the optical module 1 of the embodiment described with reference to FIGS. 1 to 4. The host device 80 is a device that supports the optical module 1 and transmits the first electric signal input to or output from the optical module 1. The host device 80 has a front panel 81, and the optical module 1 is inserted and fixed in an insertion opening formed in the front panel 81.

Figure 6:
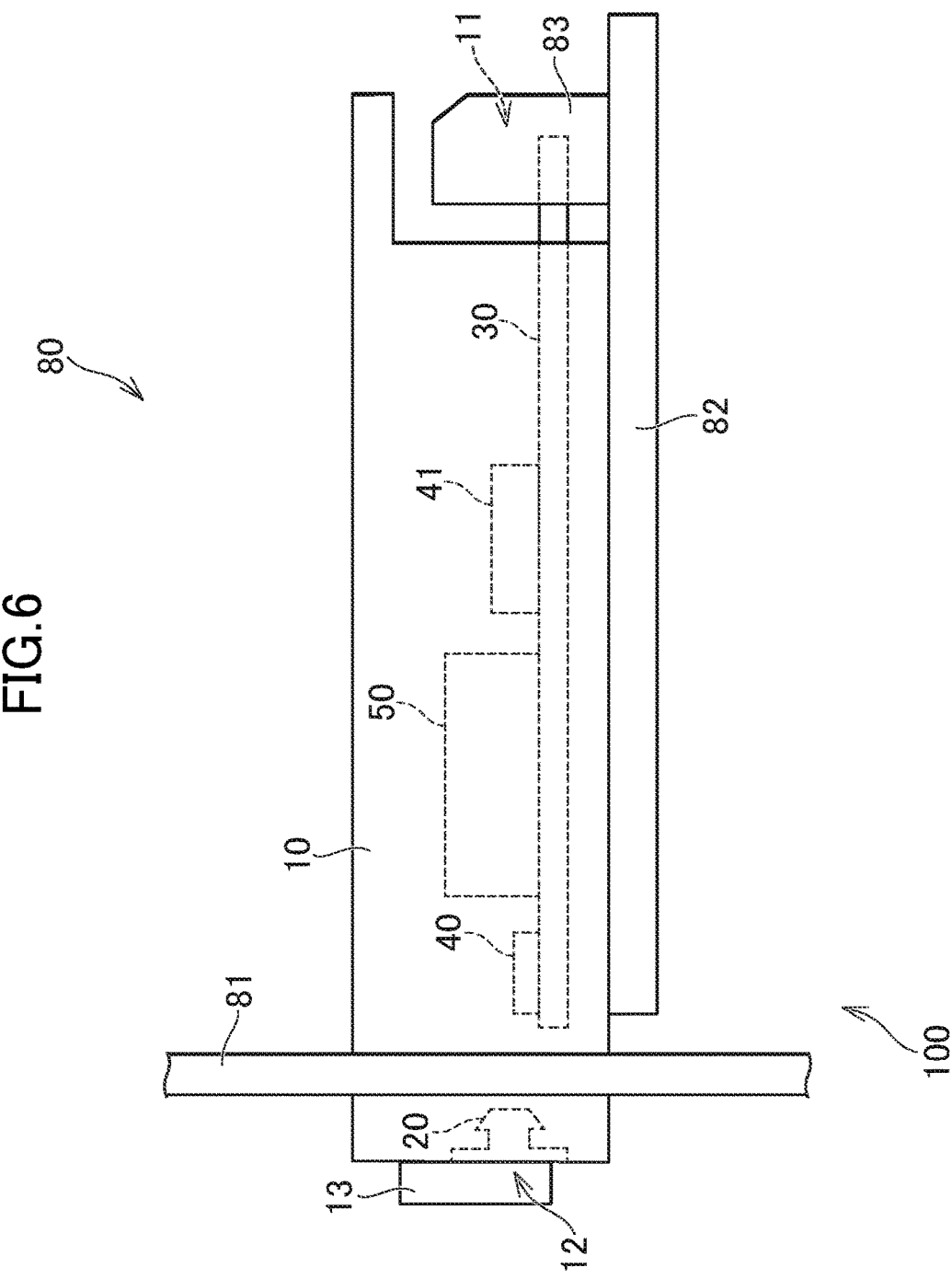
FIG. 6 is a side view of the transmission device of the embodiment of the invention.

FIG. 6 is a side view of the transmission device 100 of the embodiment of the invention. The host device 80 has a connector 83 for inputting/outputting the first electric signal to/from the optical subassembly 50 through the first opening 11, and a board 82 for supporting the housing 10. The connector 83 is connected to the first electrode 31 exposed through the first opening 11. The optical module 1 is inserted in the insertion opening of the front panel 81 and is fixed on the board 82 by inserting the connector 83 into the first opening 11.

Here, the second opening 12 of the optical module 1 is blocked by the electromagnetic radiation blocking means 20. In this way, the electromagnetic waves generated from the control circuit 41 and the like are prevented from leaking to the outside of the housing 10 even when the optical subassembly 50 is operated by connecting the optical module 1 to the connector 83. Therefore, even when a plurality of insertion openings are provided in the front panel 81 and the transmission device 100 includes a plurality of optical modules 1, crosstalk between the optical modules 1 is prevented.

While there have been described what are at present considered to be certain embodiments of the invention, it will be understood that various modifications may be made thereto, and it is intended that the appended claims cover all such modifications as fall within the true spirit and scope of the invention.

What is claimed is:

1. An optical module comprising:
a housing having a first opening for inputting or outputting a first electric signal, a second opening for inputting or outputting a second electric signal, and an optical signal port,
one or more substrates disposed in the housing, to/from which the first electric signal is input/output through the first opening and to/from which the second electric signal is input/output through the second opening,
an optical subassembly disposed in the housing and optically connected to the optical signal port, and
a control circuit disposed in the housing and mounted on the substrate for controlling the optical subassembly,
wherein:
the first electric signal input or output through the first opening is an electric signal input to or output from the optical subassembly,
the second electric signal input or output through the second opening is an electric signal input to or output from the control circuit,
the first opening is provided on a first side of the housing different from a second side of the housing on which the second opening is provided, and
the second opening is blocked by an electromagnetic radiation blocking means.

2. The optical module of claim 1, wherein the electromagnetic radiation blocking means is formed of conductive rubber.

3. The optical module of claim 1, wherein the second opening and the optical port are provided on the second side of the housing.

4. The optical module of claim 1, wherein the substrate has a terminal portion through which the second electric signal is input or output, the terminal portion being positioned at an outlet of the second opening.

5. The optical module of claim 1, wherein the electromagnetic radiation blocking means has a stopper which meshes with the housing to fix the electromagnetic radiation blocking means in the second opening.

6. The optical module of claim 5, wherein the housing has a structure for releasing the meshing with the stopper.

7. An optical module comprising:
a housing having a first opening for inputting or outputting a first electric signal, a second opening for inputting or outputting a second electric signal, and an optical signal port,
one or more substrates disposed in the housing, to/from which the first electric signal is input/output through the first opening and to/from which the second electric signal is input/output through the second opening,
an optical subassembly disposed in the housing and optically connected to the optical signal port, and
a control circuit disposed in the housing and mounted on the substrate for controlling the optical subassembly,
wherein:
the first electric signal input or output through the first opening is an electric signal input to or output from the optical subassembly,
the second electric signal input or output through the second opening is an electric signal input to or output from the control circuit,
the first opening is provided on a first side of the housing different from a second side of the housing on which the second opening is provided,
the substrate has a terminal portion through which the second electric signal is input or output, the terminal portion being positioned at an outlet of the second opening, and
the housing has a guide wall connected to an upper side of the second opening and inclined downward from the second opening toward the terminal portion.

8. A transmission device comprising:
an optical module and a host device,
wherein the optical module includes:
a housing having a first opening for inputting or outputting a first electric signal, a second opening for inputting or outputting a second electric signal, and an optical signal port,
one or more substrates disposed in the housing, to/from which the first electric signal is input/output through the first opening and to/from which the second electric signal is input/output through the second opening,
an optical subassembly disposed in the housing and optically connected to the optical signal port, and
a control circuit disposed in the housing and mounted on the substrate for controlling the optical subassembly,
the first electric signal input or output through the first opening is an electric signal input to or output from the optical subassembly,
the second electric signal input or output through the second opening is an electric signal input to or output from the control circuit, and
the first opening is provided on a first side of the housing different from a second side of the housing on which the second opening is provided,
wherein the host device includes:
a connector for inputting or outputting the first electric signal to the optical subassembly through the first opening, and
a board for supporting the housing, and
wherein the second opening is sealed by an electromagnetic radiation blocking means.

9. The transmission device of claim 8, wherein the second opening and the optical port are provided on the second side of the housing.

* * * * *